F. B. MORTON.
PLUMBING FITTING.
APPLICATION FILED AUG. 19, 1908.
922,311. Patented May 18, 1909.
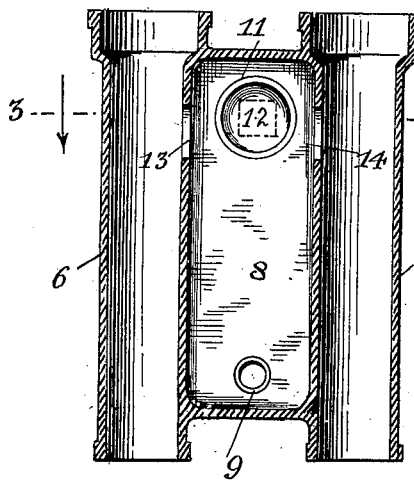
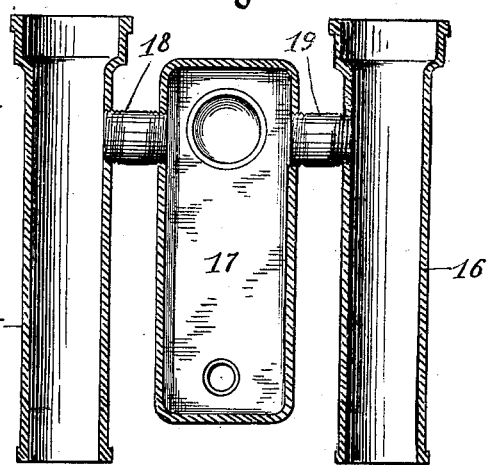
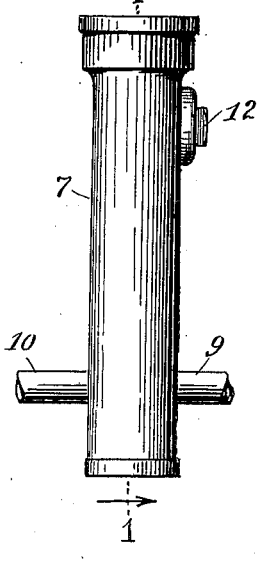
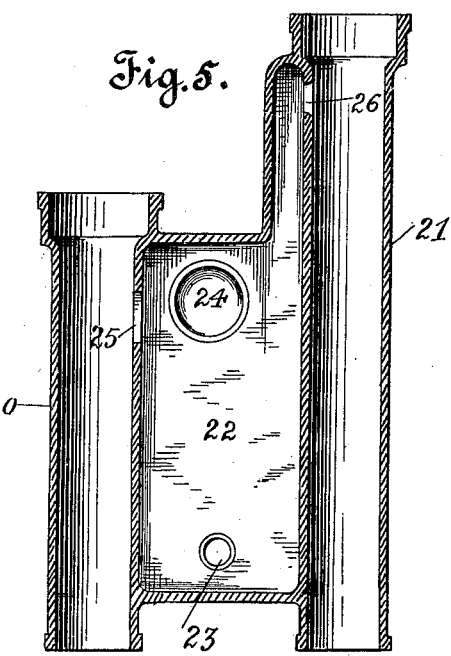
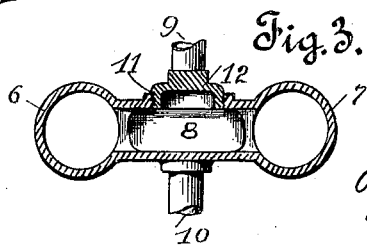
Witnesses. Inventor,
Fred B. Morton,
By _____
Attorney.

UNITED STATES PATENT OFFICE.

FRED B. MORTON, OF PASADENA, CALIFORNIA, ASSIGNOR OF ONE-HALF TO G. E. HARPHAM, OF LOS ANGELES, CALIFORNIA.

PLUMBING-FITTING.

No. 922,311.  Specification of Letters Patent.  Patented May 18, 1909.

Application filed August 19, 1908. Serial No. 449,280.

*To all whom it may concern:*

Be it known that I, FRED B. MORTON, a citizen of the United States, residing in Pasadena, county of Los Angeles, and State of California, have invented new and useful Improvements in Plumbing-Fittings, of which the following is a specification.

In putting in plumbing in buildings where there are fixtures on opposite sides of a partition it has been customary to place a trap under each fixture and to vent the lateral pipes at and above the trap. In such construction the traps are usually rather small and therefore hold but little liquid seal. They are usually placed under the fixture and are unsightly. When the use of a fixture is discontinued for several days the liquid evaporates and sewer gas enters such apartment.

It is the object of my invention to provide a fitting primarily designed for two fixtures on opposite sides of the partition which shall contain a common trap into which both fixtures will discharge so that in case the use of either fixture is discontinued, no matter for how long a time, the trap will be sealed through the use of the other fixture and no gas can enter either apartment.

Another object is to so arrange the trap and the soil pipe into which it discharges and the vent pipe so that the same may all be placed within the partition and out of sight.

Another object is to provide the trap with a large clean out opening, closed with a plug, so that the trap can be easily and quickly cleaned if necessary.

My improved fitting is described herein and illustrated in the accompanying drawings in which:

Figure 1 is a section on the line 1—1 of Fig. 2. Fig. 2 is an edge view of the parts shown in Fig. 1. Fig. 3 is a section on the line 3—3 of Fig. 1. Fig. 4 is a longitudinal vertical central section of a modified form. Fig. 5 is a central vertical section of another modified form of fitting.

In the drawings 6 and 7 are sections of cast sewer pipe which are united by trap 8 as shown in Figs. 1, 2 and 3. Connected to the trap at each side and near the bottom thereof are pipes 9 and 10 which lead to and are connected to the fixtures not shown. Where only one fixture is used one opening would be omitted or plugged.

11 is an opening in the side wall near the top of the trap in one side thereof which is closed by plug 12, thereby providing means for cleaning the trap. Pipe 6 is connected to the trap near the top thereof by port 13 and pipe 7 is connected with the trap near the top thereof by a port 14.

In Fig. 4 I have shown the sections of pipe, 15 and 16, constructed separately from the trap 17 and connected thereto by nipples 18 and 19.

In Fig. 5 the shorter section 20 is waste pipe and the longer section 21 is vent pipe, and these sections are connected by trap 22 which is preferably cast integral with said pipe.

23 is one of the pipes that leads to the fixtures in the room.

24 is the clean out plug.

25 is a port which connects the upper portion of the trap with the waste pipe, and 26 is the port that connects the trap and the vent pipe.

In the form illustrated in Figs. 1 to 3, pipe 6 or 7 will perform the office of both waste and vent pipe as a portion of the waste from the trap will pass out at port 13 and a portion will pass out at port 14. In this construction both ports will be kept open by the flow of the waste.

In Fig. 5 the waste will pass out through port 25, while port 26 will vent the trap. By the construction shown in the drawings a large trap can be provided and the same can be inclosed within the partition so as to be out of sight. In the construction illustrated in Figs. 1, 2, 3, and 5 the parts are all cast integral thereby avoiding joints wherein leakage is liable to occur from imperfect workmanship.

Having described my invention what I claim is:

1. Two parallel sections of sewer pipe; and a trap intermediate said sections, said pipes having ports near the top thereof opening into the trap, and fixture connections at the bottom of said trap one on each side thereof.

2. Two parallel sections of sewer pipe; and a trap intermediate said sections and having ports opening into each section of pipe, one of said ports being higher than the other, and fixture connections at the bottom of said trap one on each side thereof.

3. Two parallel sections of sewer pipe; and a trap intermediate said sections, said sections and trap being cast integral, said trap having ports near the top thereof opening into each of said pipes, a clean out opening near the top thereof, and fixture connections opening into said trap near the bottom thereof one on each side thereof.

In witness that I claim the foregoing I have hereunto subscribed my name this 12th day of August, 1908.

FRED B. MORTON.

Witnesses:
G. E. HARPHAM,
S. B. AUSTIN.